United States Patent
Takahashi et al.

(10) Patent No.: US 6,383,823 B1
(45) Date of Patent: May 7, 2002

(54) PROBE FOR SCANNING PROBE MICROSCOPE (SPM) AND SPM DEVICE

(75) Inventors: Hiroshi Takahashi; Nobuhiro Shimizu; Yoshiharu Shirakawabe, all of Chiba (JP)

(73) Assignee: Seiko Instruments Inc. (JP)

(*) Notice: Subject to any disclaimer, the term of this patent is extended or adjusted under 35 U.S.C. 154(b) by 0 days.

(21) Appl. No.: 09/328,139

(22) Filed: Jun. 8, 1999

(30) Foreign Application Priority Data

Jun. 9, 1998 (JP) .......................................... 10-161173
Jun. 1, 1999 (JP) .......................................... 11-153937

(51) Int. Cl.[7] .......................... H01L 31/26; H01L 21/66

(52) U.S. Cl. ........................................ 438/14; 438/401

(58) Field of Search ............................ 438/14, 16, 401, 438/479, 704, 748, 795; 250/216, 234, 306, 307, 423; 73/104, 105, 812, 826.4

(56) References Cited

U.S. PATENT DOCUMENTS

| | | | | |
|---|---|---|---|---|
| 5,386,110 A | * | 1/1995 | Toda | 250/216 |
| 5,444,244 A | * | 8/1995 | Kirk et al. | 250/306 |
| 5,705,814 A | * | 1/1998 | Young et al. | 250/306 |
| 5,925,259 A | * | 7/1999 | Biebuyck et al. | 216/2 |
| 6,176,122 B1 | * | 1/2001 | Shimizu et al. | 73/105 |

* cited by examiner

Primary Examiner—David Nelms
Assistant Examiner—Phuc T. Dang
(74) Attorney, Agent, or Firm—Adams & Wilks

(57) ABSTRACT

To provide an SPM probe comprising an SPM probe having a piezoresistor and enable to measure surface voltage of a sample. An SPM probe forming a piezoresistor 20 has conductivity covering metal film 22 on a tip surface 12, and conductive layer 24 is wired from the metal film 22 so as to be one side of an electrode. By that, it is possible to measure interaction between the sample surface by detecting bending quantity of the SPM probe by the piezoresistor and the tip, and to measure voltage of the sample surface without using a detector needing complicated adjustment.

40 Claims, 17 Drawing Sheets

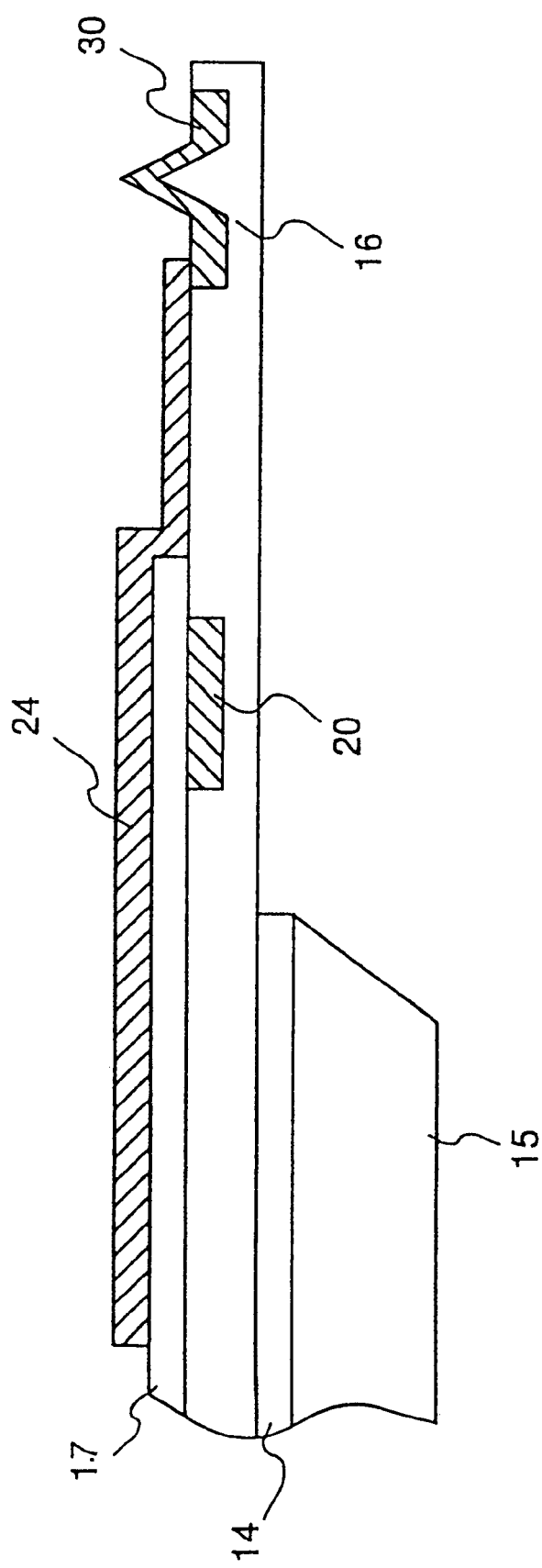

PROBE FOR SCANNING PROBE MICROSCOPE (SPM) AND SPM DEVICE

BACKGROUND OF THE INVENTION

The present invention relates to an SPM probe, particularly a self-detecting SPM probe having a piezoresistor.

A scanning probe microscope (SPM) such as an atomic force microscope (AFM) is widely used to observe small region of nanometer order on a sample surface nowadays. The SPM uses an SPM probe which a tip is formed at edge thereof as a scanning probe. In the SPM using the probe, shape of the sample surface is measured by scanning the sample surface with the tip of the SPM probe, and by detecting interaction (attractive force or repulsive force) generating between the sample surface and the tip as bending quantity of the SPM probe.

Bending quantity of the SPM is detected by irradiating laser beam to the SPM probe and by measuring change of the reflected angle. Here, the SPM probe used for this system is called optical lever SPM probe. However, fine adjustment of irradiating angle of the laser beam irradiating to the SPM probe and position of a photodiode detecting the reflected beam from the SPM probe is need at use of the optical lever SPM probe. Particularly, there has been complicated that the fine adjustment should be repeated at exchange of SPM probe carried out frequently.

Then, a self-detecting SPM probe detecting bending quantity of the SPM probe by forming a piezoresistor at the SPM probe and by measuring change of the resistance value is drawing public attention.

Constitution of the conventional self-detecting SPM probe is shown in FIG. 13 and FIG. 14. FIG. 13 is a plane view and FIG. 14 is a sectional view taken along line D–D' of FIG. 13. As shown in FIG. 13, a self detecting SPM probe 100 comprises an SPM probe 102 having a tip (not shown) at edge thereof and a reference 104 for measuring reference resistor value. These SPM probe 102 and reference 104 form U-shaped piezoresistors 108 and 110 each on surface thereof. Here, the piezoresistors 108 and 110 are formed on an n-type silicon substrate 106 as injecting selectively p-type impurity ion in U-shape each as $p^+$ piezoresistor.

Moreover, as shown in FIG. 14, silicon oxide film ($SiO_2$) 112 protecting the surface except a metal contacting portion of the SPM probe and a metal contacting portion of the reference 104 is formed. Aluminum electrodes 114, 116, 118, and 120 for contacting are produced at each of metal contacting portions. Although $p^+$ piezoresistors 108 and 110 are formed at surface of n-type silicon substrate 106 by injecting p-type impurity ion, reversely at use of p-type silicon substrate, $n^+$ piezoresistors are formed by injecting n-type impurity ion.

Observation of the sample surface by the above conventional self-detecting SPM probe 100 is carried out by scanning the sample surface with the SPM probe 102 where a tip is formed at edge portion thereof first. Interaction (attractive force or repulsive force) generating between the sample surface and the tip bends the SPM probe 102, and the bending changes resistance value of the piezoresistor 108 formed on the SPM probe 102. The resistance value is detected as bending quantity of the SPM probe 102. Change of resistance value of the piezoresistor 108 is led to a signal processing portion (not shown) through the above-mentioned aluminum electrodes 114 and 116 of the metal contacting portion so as to make image as signal showing the sample surface.

At the same time as the above operation, measurement of resistance value is carried out at the reference 104. This measurement provide reference resistance value for removing unnecessary data of changing from change of resistance value measured at the SPM probe because of changing by condition except bending of temperature and so on. Temperature compensation is realized at detecting using a bridge circuit.

The self-detecting SPM probe using the above piezoresistor is disclosed in Japanese Opened Patent No. 5-116458 and U.S. Pat. No. 5,345,815.

As above-mentioned, as a detector detecting bending quality of the SPM probe, namely the piezoresistor is formed at the probe itself in the case that the self-detecting SPM probe is used for a scanning probe microscope, complicated operation such as position adjustment of the detector like the conventional optical lever are not need at exchange of the SPM probe so as to speedily start observation of the sample.

The conventional optical lever SPM probe has been able to measure change of bending of the SPM probe based on capacitance induced by change of current flowing between a tip and a sample surface or supply of voltage which is supplied between the tip and the sample surface by the tip having conductivity. Particularly, Kelvin probe force microscope (KFM) or scanning Maxwell stress microscope is used as microscope supplying voltage between the tip and the sample surface using the conductive SPM probe and measuring voltage and the like of the sample surface.

However, the conventional optical lever SPM probe enable to measure voltage of the sample surface generally has had conductivity at only the whole SPM probe including a tip or surface thereof. As the self-detecting SPM probe forming a piezoresistor on the SPM probe can not have conductivity at the whole of SPM probe including the tip, the probe has not been used for the above KFM and SMM.

The present invention is provided in view of inconvenience the above prior art. An object of the invention is to provide an SPM probe enabling to detect bending quantity of the SPM probe by a piezoresistor formed at the SPM probe and to measure voltage a sample surface.

SUMMARY OF THE INVENTION

To solve the above-mentioned problem and achieve the object, an SPM probe according to the invention of a first aspect is characterized by that conductive film formed on is covered at said tip and near by the tip in the SPM probe comprising a lever portion which a sharpened tip is formed at edge thereof and a supporting portion for supporting the lever portion.

According to the present invention of the first aspect, as the tip has conductivity by covering the conductive film at the tip surface, it is possible that voltage is supplied between the sample being one side of electrode and the tip by taking out wiring from the conductive film for another side of electrode. As the whole of SPM prove does not have conductivity, mixing of noise can be protected.

An SPM probe according to the invention of a second aspect is characterized by that wiring is taken out from vicinity of said tip of said conductive film in the first aspect.

According to the SPM according to the present invention of a second aspect, it is possible to prevent heating of the SPM probe by voltage supply and to supply high voltage being small in loss by taking out wiring from the conductive film covering the tip surface and by selecting material being high in conductivity as wiring.

An SPM probe according to the invention of a third aspect comprises a lever portion forming a sharpened tip at edge thereof, a supporting portion for supporting the lever portion, and a bending portion connecting said lever portion and said supporting portion. The SPM probe is characterized by that conductive film is covered at said tip and vicinity thereof, insulation layer is formed on said piezoresistor and said supporting portion, and conductive layer connecting electrically to said conductive film at vicinity of said tip of said conductive film and connecting to said supporting portion through said bending portion from said lever portion in the U-shaped SPM probe passing said bending portion.

According to the present invention of the third aspect, as the probe has conductivity by covering the conductive film at the tip surface, one side of electrode is formed wiring the conductive layer from the conductive film and it is possible to supply voltage between the sample being another side of electrode and the tip. As whole of the SPM probe does not have conductivity, it is possible to prevent heating of the SPM probe by voltage supply and to supply high voltage being small in loss. It is possible to measure interaction between the sample surface by detecting bending quantity of the SPM probe caused by the piezoresistor and the tip and to measure voltage of the sample surface without using a detector needing complicated adjustment.

An SPM probe according to the invention of a fourth aspect is characterized by that said conductive layer is formed on said conductive film at part connected electrically between said conductive layer and said conductive film in the invention of the third aspect.

According to the invention of the fourth aspect, as the probe has conductivity by covering the conductive film at the tip surface, one side of electrode is formed wiring the conductive layer from the conductive film and it is possible to supply voltage between the sample being another side of electrode and the tip.

An SPM probe according to the invention of a fifth aspect is characterized by that said conductive layer is formed under said conductive film at part connected electrically between said conductive layer and said conductive film in the invention of the third aspect.

According to the invention of the fifth aspect, as the probe has conductivity by covering the conductive film at the tip surface, one side of electrode is formed wiring the conductive layer from the conductive film and it is possible to supply voltage between the sample being the other side of electrode and the tip.

An SPM probe according to the invention of a sixth aspect is characterized by that conductive region is formed injecting ion in said tip in the SPM probe comprising a lever portion forming a sharpened tip at an edge thereof and a supporting portion for supporting the lever.

According to the present invention of the sixth aspect, the tip can have conductivity without losing sharpness by forming the conductive region by ion-injection at part forming the tip. Therefore, it is possible that voltage is supplied between the sample being one side of electrode and the tip by taking out wiring from the conductive film for the other side of electrode. As the whole of SPM prove does not have conductivity, mixing of noise can be protected.

An SPM probe according to the invention of a seventh aspect is characterized by that wiring is taken out from vicinity of said tip of said conductive region in the invention of the sixth aspect.

According to the present invention of a seventh aspect, the electrode wiring can be taken out from conductive region formed at the tip, and it is possible to prevent heating of the SPM probe by voltage supply and supply high voltage being small in loss by selecting high material high in conductivity as the electrode wiring.

An SPM probe according to the invention of a eighth aspect comprises a lever portion forming a sharpened tip at edge thereof, a supporting portion for supporting the lever portion, and a bending portion connecting said lever portion and said supporting portion. The SPM probe is characterized by that conductive region is formed in said tip by ion injection, insulation layer is formed on said piezoresistor and said supporting portion, and conductive layer connecting electrically to said conductive region at vicinity of said tip of said conductive region and connecting to said supporting portion through said bending portion from said lever portion.

According to the present invention of the eighth aspect, as the probe forms tip conductive region by ion-injecting at part forming the tip, the tip can have conductivity without losing sharpness. Therefore it is possible to supply voltage between the sample being one side of electrode and the tip by making another electrode taking out wiring from the tip conductive region. As whole of the SPM probe does not have conductivity, it is possible to prevent mixing noise, to prevent heating of the SPM probe by voltage supply, and to supply high voltage being small in loss.

An SPM probe according to the invention of ninth aspect comprises a lever portion forming a sharpened tip at edge thereof, a supporting portion for supporting the lever portion, and a bending portion connecting said lever portion and said supporting portion. The SPM probe is characterized by that a piezoresistor is formed on the SPM probe, insulation layer is formed on said piezoresistor and said supporting portion, and conductive layer covering said tip and vicinity thereof and connecting to said supporting portion through said bending portion from said lever portion.

According to the invention of ninth aspect, the SPM probe forming the piezoresistor has conductivity at the tip surface and the conductive layer from the tip surface. Therefore, it is possible to measure interaction between the sample surface by detecting bending quantity of the SPM probe caused by the piezoresistor and the tip and to measure voltage of the sample surface without using a detector needing complicated adjustment. By selecting material of the conductive layer led from the tip, an SPM probe having a priority in sharpness of the tip and an SPM probe having a priority in conductivity of wiring led from the tip can be provided. Therefore, users can select a suitable SPM probe for object of use or the observed sample.

An SPM probe according to a tenth aspect is characterized by that an identification mark for identifying a position in a semiconductor wafer is formed at said supporting portion when said SPM probe is formed on the semiconductor wafer and is taken out being separated from said the semiconductor in any of the first to ninth aspects.

According to the invention of the tenth aspect, the identification mark for identifying a position on the semiconductor wafer mark is formed at the SPM probe formed at the semiconductor wafer as the SPM probe. As the position on the semiconductor wafer in which the SPM probe is formed can be identified, positional distribution of rejected SPM probes on the wafer can be obtained for the rejected SPM probes by reading out the identification mark even if the SPM probe is taken from the semiconductor wafer.

The invention of an eleventh aspect is characterized by that a device is the device using any of the SPM probes of the first to tenth aspects. As adjustment of a laser beam is not needed because a self-detecting type cantilever is used in the device as compared with the conventional optical lever type device, and operation of the device is easy. Noise is decreased by forming an exclusive electrode so as to measure more accurately.

BRIEF DESCRIPTION OF THE DRAWINGS

FIG. 9 is a sectional view taken by line B–B' of FIG. 1 according to the third embodiment.

DETAILED DESCRIPTION OF THE PREFERRED EMBODIMENTS

Referring figures, embodiments of SPM probes according to the present invention will be described in detail. The invention is not limited by these embodiments.

(First Embodiment)

Figure 1:
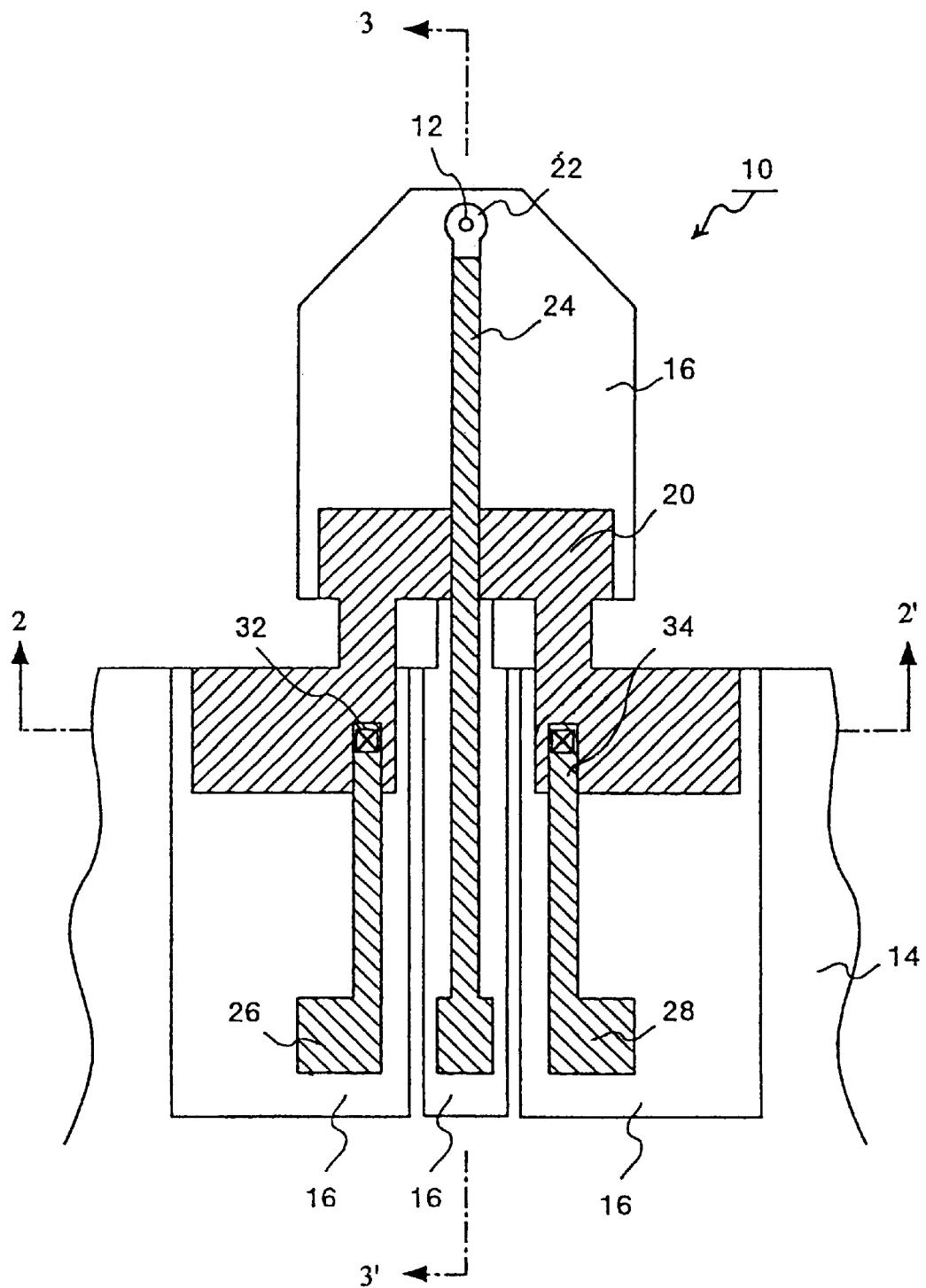
FIG. 1 is a plane view showing an SPM probe according to the present invention.

FIG. 1 is a plane view showing an SPM probe 10 according to a first embodiment. In FIG. 1, the self-detecting type SPM probe 10 has constitution connecting a lever portion forming a tip 12 at edge thereof and a supporting portion with three bending portions for connecting, namely SPM probe shape. Two of the three bending portions are formed almost symmetrically with a respect to center line of a conductive layer 24. A U-shaped piezoresistor 20 reaching the lever portion through one of the bending portion from a supporting portion of the SPM probe and leading to the supporting portion through other of the bending portion is formed at these bending portions. That is, the SPM probe 10 is the self-detecting type SPM probe above-mentioned.

On the piezoresistor 20 and the supporting portion, insulation layer (not shown) is formed. On the insulation layer, each of conductive layers 26 and 28 performing as wiring is formed connecting from a part positioned at the supporting portion of the piezoresistor 20 to a part where the piezoresistor 20 is not formed at the supporting portion. One end positioned at the piezoresistor 20 at the conductive layers 26 and 28 and the piezoresistor 20 of the lower layer are connected electrically to metal contacting portions 32 and 34 each.

Rest of the bending portions not forming any piezoresistor among the bending portions is formed on the above-mentioned center line. A conductive layer 24 is formed on the bending portion from the tip 12 to the SPM probe 10 sandwiching the insulation layer. Here, the tip 12 is covered by a conductive film 22, and the conductive film 22 and one end of a conductive layer 24 are connected electrically.

Figure 2:
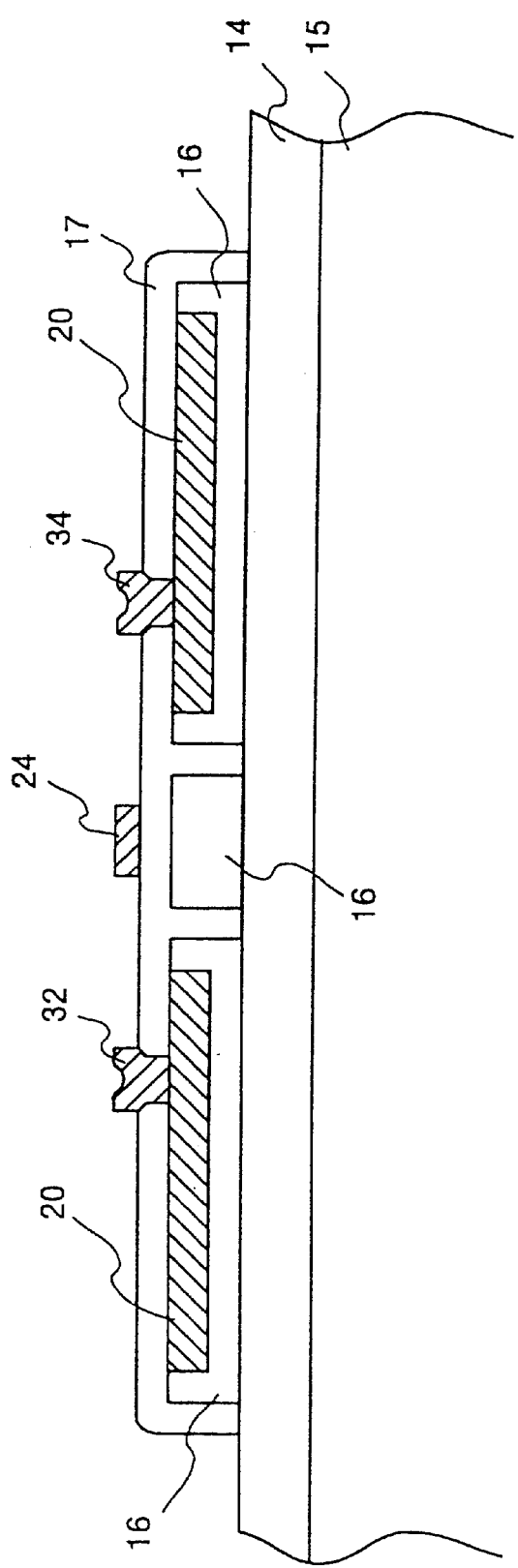
FIG. 2 is a sectional view taken by line A–A' of FIG. 1 according to a first embodiment.

FIG. 2 is a sectional view taken by line A–A' of FIG. 1. As shown in FIG. 2, the SPM probe 10 forms oxide layer ($SiO_2$) 14 buried on a semiconductor substrate 15 made of silicon (a silicon layer 15) is formed, and a silicon layer 16 is formed on the oxide layer using silicon on insulator (SOI) technique thermally bonding the silicon layer. By the SOI technique, separation of elements is achieved with a high insulation between parts positioned at the supporting portion of the piezoresistor 20.

In the supporting portion of the above-mentioned SPM probe 10, as shown in FIG. 2, the semiconductor substrate 15 forming the oxide layer 14 on surface thereof is made for substrate, and the silicon layer 16 is formed on the oxide layer 14. Particularly, the silicon layer 16 is divided to three regions at the supporting portion of the SPM probe, and both end portions of the piezoresistor 20 are formed in two regions among them. In FIG. 2, the metal contacting portions 32 and 34 are connected to the piezoresistor 20 each. Here, the lever portion of the SPM probe 10 is made of the silicon layer 16 connecting to the supporting portion through three bending portions as substrate.

A silicon oxide film 17 is formed at surface except the metal contacting portions 32 and 34 on the silicon layer 16 of the piezoresistor 20 and the supporting portion. The silicon oxide film 17 is equivalent to the above-mentioned insulation layer. Therefore, the above-mentioned conductive layers 26 and 28 are formed on the silicon oxide film 17.

Figure 3:
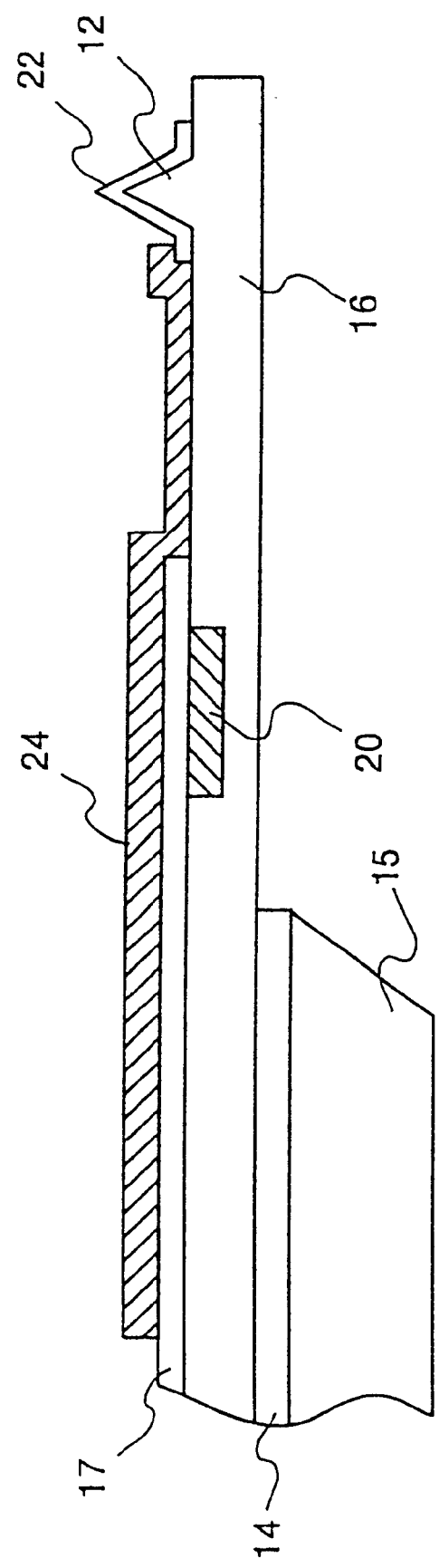
FIG. 3 is a sectional view taken by line B–B' of FIG. 1 according to a first embodiment.

FIG. 3 is a sectional view taken by line B–B' of FIG. 1. As shown in FIG. 3, the above-mentioned conductive layer 24 is located so as to pass on the silicon layer 16 being substrate of the lever portion and the silicon oxide film 17 formed on the piezoresistor 20 and the silicon layer at the supporting portion from a conductive film 22 covering the tip 12. Here, one end of the conductive layer 24 and a part of the conductive film 22 are connected electrically setting of the conductive film 22 at the lower layer of the two.

Therefore, voltage can be supplied between the tip 12 and the sample surface (not shown) by making the sample being observation object of the SPM one side of the electrode and by making the conductive layer 24 positioned at the supporting portion of the SPM probe 10.

Next, process of forming the SPM probe 10 shown in FIG. 1 will be described referring FIGS. 4A to 4I. In FIGS. 4A to 4I, sectional views of process of forming the SPM probe 10 taken by line B–B' of FIG. 1 are shown.

First, FIG. 4A will be described. Siliconoxide films ($SiO_2$) 19 and 13 are formed by thermal oxidation of front side and back side of the SOI substrate, and a photoresist film 21 performing as an etching mask is patterned on the silicon oxide film 19.

Figure 4A:
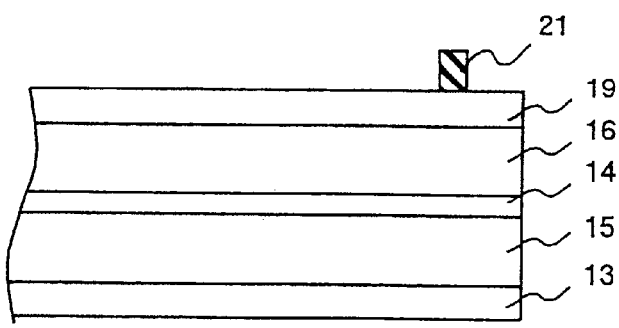
FIGS. 4A to 4I are sectional views describing process of forming the SPM probe according to a first embodiment.
Figure 4B:
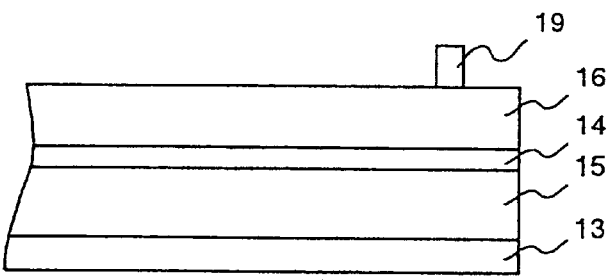

Next, silicon oxide film ($SiO_2$) 19 performing a mask for forming the tip is patterned as shown in FIG. 4B by solution-etching the silicon oxide film 19 using buffer hydrofluoric acid solution (BHF) masking the photoresist film 21.

Figure 4C:
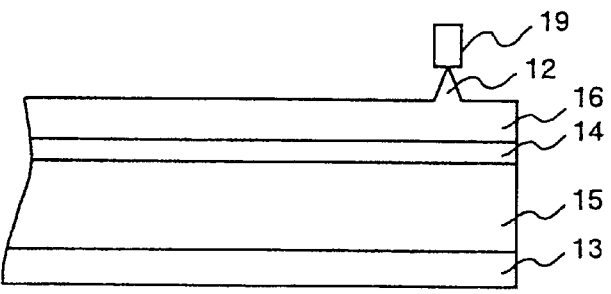

Continuously, the sharpened tip 12 is formed under the mask 19 by carrying out reactive ion etching (RIE) masking the silicon oxide film 19 patterned as shown in FIG. 4C. Here, height of the tip 12 is more than 2 $\mu$m generally, and is set 5 to 15 $\mu$m usually.

Figure 4D:
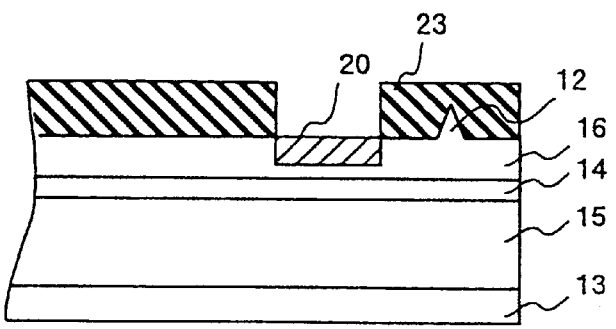

Moreover, as shown in FIG. 4D, a photoresist film 23 is formed opening a region forming the piezoresistor on surface of the silicon layer 16, and $p^+$ piezoresistance region, namely a piezoresistor 20 is formed injecting ion at the opening part.

Figure 4E:
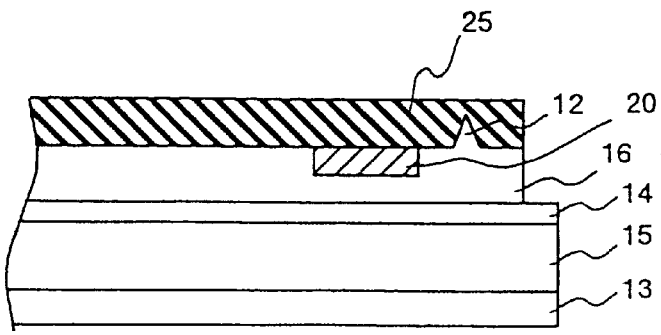

Removing the photoresist film 23, a photoresist film 25 being SPM probe shape is formed on the silicon layer 16 as shown in FIG. 4E. An end portion of the SPM probe is formed by etching the silicon layer 16 till arriving the buried oxide layer 14 using RIE masking the photoresist film 25.

Figure 4F:
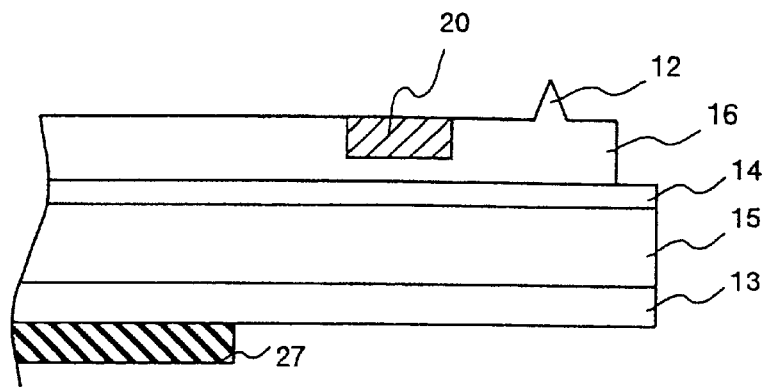

As shown in FIG. 4F, removing the photoresist film 25, a photoresist film 27 performing an etching mask is formed under the silicon oxide film ($SiO_2$) 13 of the back side. The silicon oxide film 13 is formed using patterning by carrying out using the buffer hydrofluoric acid solution (BHF) masking the photoresist film 27.

Figure 4G:
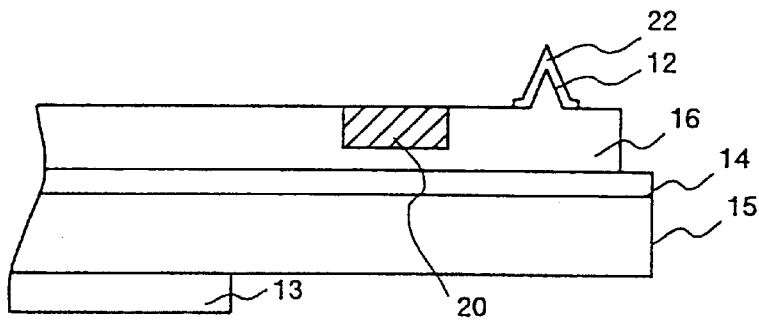

As shown in FIG. 4G, by spattering surface and outer edge portion of the tip 12, a conductive film 22 is formed covering with comparatively high titanium (Ti), platinum (pt), and so on in hardness. Here, it is desirable that thickness of the conductive film 22 should be made as thin as possible in the extent that sharpness of the tip is lost.

Figure 4H:
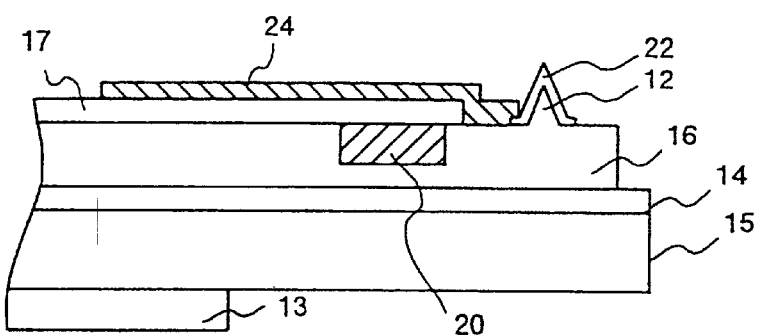

As shown in FIG. 4H, the surface is protected covering from the supporting portion of the silicon layer 16 to region where the piezoresistor 20 at the lever portion is formed with the silicon oxide film 17, and a conductive layer 24 is formed comparatively thick with metal such as aluminum (Al) and the like so as to connect to the supporting portion from the tip 12 through the bending portion. Here, one end of the conductive layer 24 positioned at the lever portion and a part of the conductive film 22 are connected electrically setting the conductive film 22 as the lower layer of the two. At this time, the silicon oxide film 17 is not covered at a part positioned at the supporting portion of the piezoresistor 20, at the part, metal contacting portions 32 and 34 are formed burying, for example, aluminum (Al) and the like, and conductive layers 26 and 28 wired from the metal contacting portions 32 and 34 with the silicon oxide film 17 as lower layer are formed (not shown.)

Figure 4I:
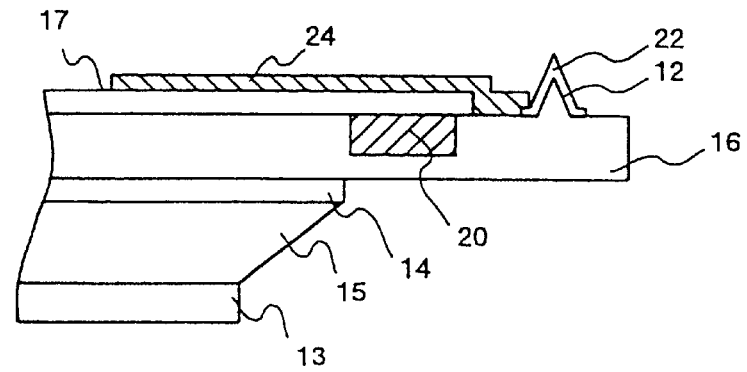

As shown in FIG. 4I, a semiconductor substrate 15 is partly removed by carrying out back etching using 40% potassium hydroxide solution ($KOH+H_2O$) masking the silicon oxide film 13 forming pattern at FIG. 4G. Moreover, oxide layer 14 is partly removed by the BHF. That forms an SPM probe comprising the silicon layer 16 having the piezoresistor 20 and the conductive layer 24.

Although $p^+$ piezoresistor 20 is formed injecting $p^+$ ion to n type silicon layer 16 here, reversely, $n^+$ piezoresistor is formed injecting $n^+$ ion to the substrate at using p type silicon layer.

Figure 5:
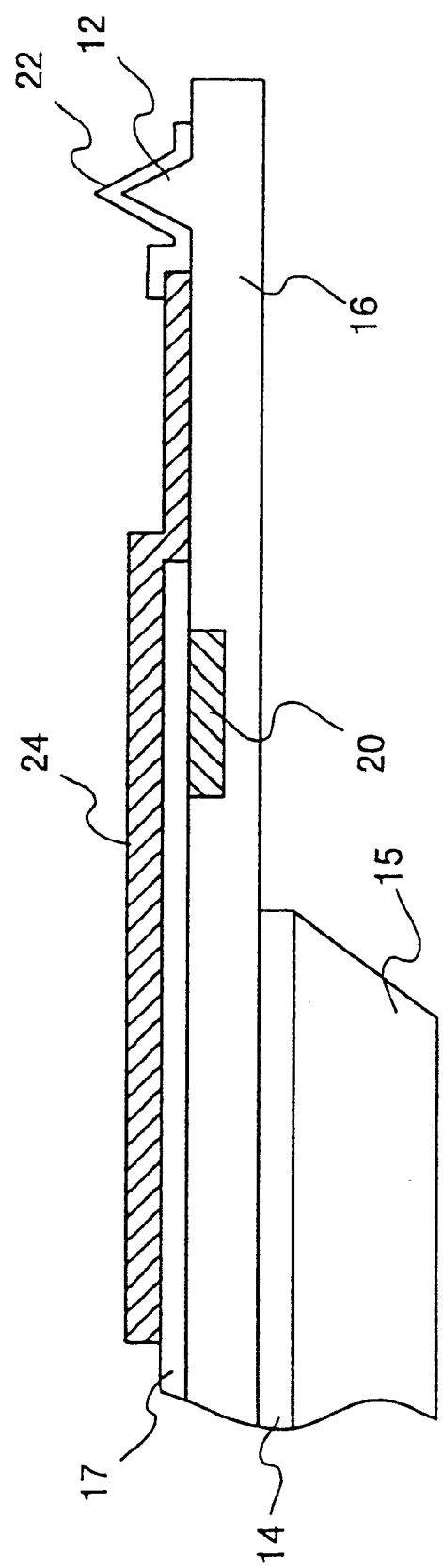
FIG. 5 is a sectional view taken by line B–B' of FIG. 1 according to modified example of the first embodiment.

FIG. 5 is a modified example in connection of the conductive layer 24 and the conductive film 22. That is, electrical connection to the conductive film 22 locating the conductive layer 24 at the lower layer may be achieved. Process of forming the SPM probe of this case is shown in FIGS. 6A to 6D.

As the similar processes to the above-mentioned FIGS. 4A to 4E are carried out first, these descriptions are omitted here and processes continued from FIG. 4E will be described.

Figure 6A:
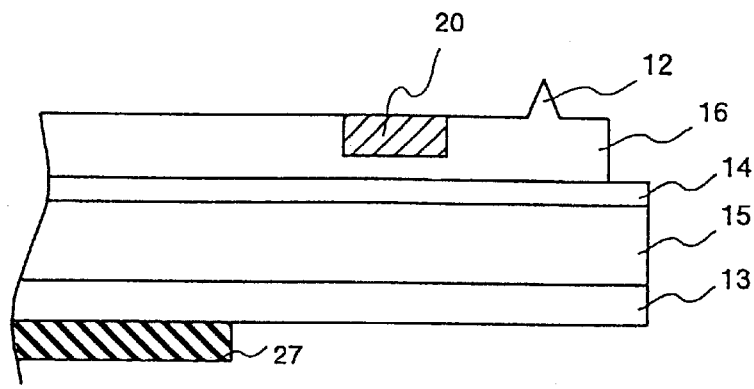
FIGS. 6A to 6D are sectional views describing process of forming the SPM probe according to a second embodiment.

Continuing from the process of FIG. 4E, as shown in FIG. 6A, removing the photoresist film 25, a photoresist film 27 performing an etching mask is formed on the silicon oxide film ($SiO_2$) 13 of the back side. The silicon oxide film 13 is patterned carrying out back-etching using the buffer hydrofluoric acid solution (BHF) masking the photoresist film 27.

Figure 6B:
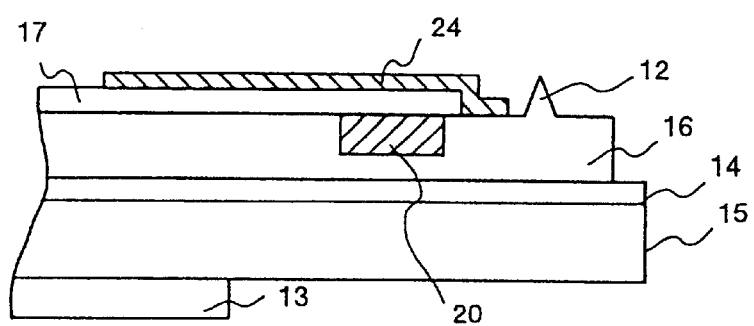

As shown in FIG. 6B, the surface is protected covering from the supporting portion of the silicon layer 16 to region where the piezoresistor 20 at the lever portion is formed with the silicon oxide film 17, and a conductive layer 24 is formed comparatively thick with metal such as aluminum (Al) and the like so as to connect to the supporting portion with the silicon oxide film 17 as lower layer from vicinity of the tip 12. At this time, metal contacting portions 32 and 34 are formed burying, for example, aluminum (Al) and the like at a part positioned at the supporting portion of the piezoresistor 20, and conductive layers 26 and 28 wired from the metal contacting portions 32 and 34 with the silicon oxide film 17 as lower layer are formed (not shown.)

Figure 6C:
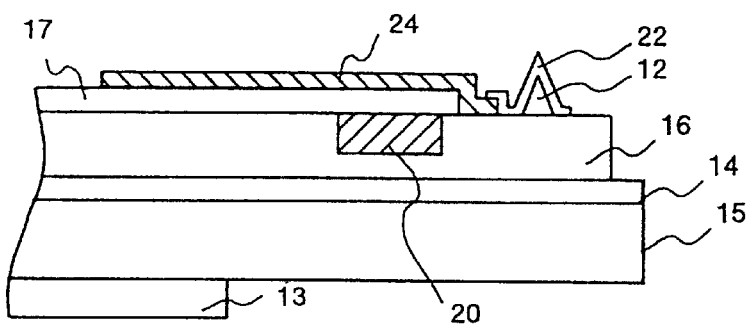

As shown in FIG. 6C, by spattering surface and outer edge portion of the tip 12, particularly a part of the conductive layer 24, a conductive film 22 is formed covering with comparatively high titanium (Ti), platinum (Pt), and so on in hardness. It is desirable that thickness of the conductive film 22 should be made as thin as possible in the extent that sharpness of the tip is lost. Here, a part of the conductive film 22 is connected electrically to one end positioned at the lever portion of the conductive layer 24 with the conductive layer as lower layer.

Figure 6D:
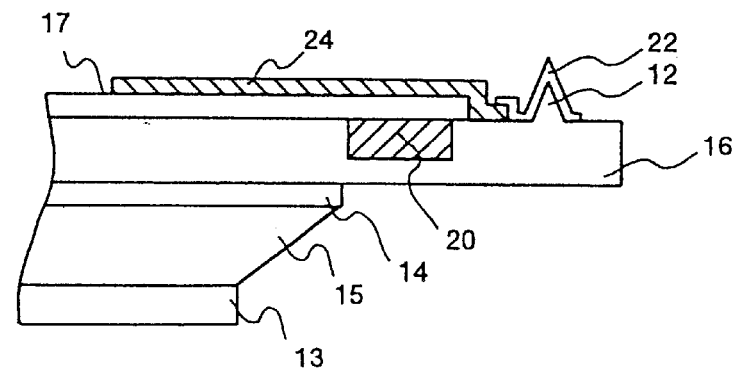

As shown in FIG. 6D, a semiconductor substrate 15 is partly removed by carrying out back etching using 40% potassium hydroxide solution ($KOH+H_2O$) masking the silicon oxide film 13 forming pattern at FIG. 4G. Moreover, oxide layer 14 is partly removed by the BHF. That forms an SPM probe comprising the silicon layer 16 having the piezoresistor 20 and the conductive layer 24.

As above-mentioned, according to the first embodiment, voltage can be supplied between the sample performing one of electrode and the tip by making the other of electrode taking out electrode wiring from the conductive film because covering the conductive film on the sample surface has conductivity. Because whole of the SPM probe does not conductivity, mixing of noise is prevented, heating of the SPM probe by voltage supply can be prevented, and high voltage being small in loss can be supplied by selecting high material in conductivity for electrode wiring taken out from the conductive film.

The lever portion and the supporting portion of the SPM probe are connected by three bending portions, a U-shaped piezoresistor is formed so as to pass through two of the bending portions, and to rest of the bending portions, the tip is connected electrically from vicinity of the tip through the supporting portion with the conductive layer. Therefore, detecting bending quantity of the SPM probe by the piezoresistor is achieved, it is possible to supply voltage to the tip. That means, measurement of interaction between the sample surface and the tip and measurement of surface voltage of the sample are possible without using a detector needing complicated position adjustment.

By selecting material suitable covering the tip and material suitable for wiring from the tip to the supporting portion, it is possible to supply highly accurately, efficiently voltage to the tip without losing sharpness of the tip.

As the conductive layer connected electrically to the tip at one end thereof is led to the supporting portion of the SPM probe 10 at the other end, the conductive layer is easy to connect an external circuit for supplying voltage to the tip.

(Second Embodiment)

Figure 7:
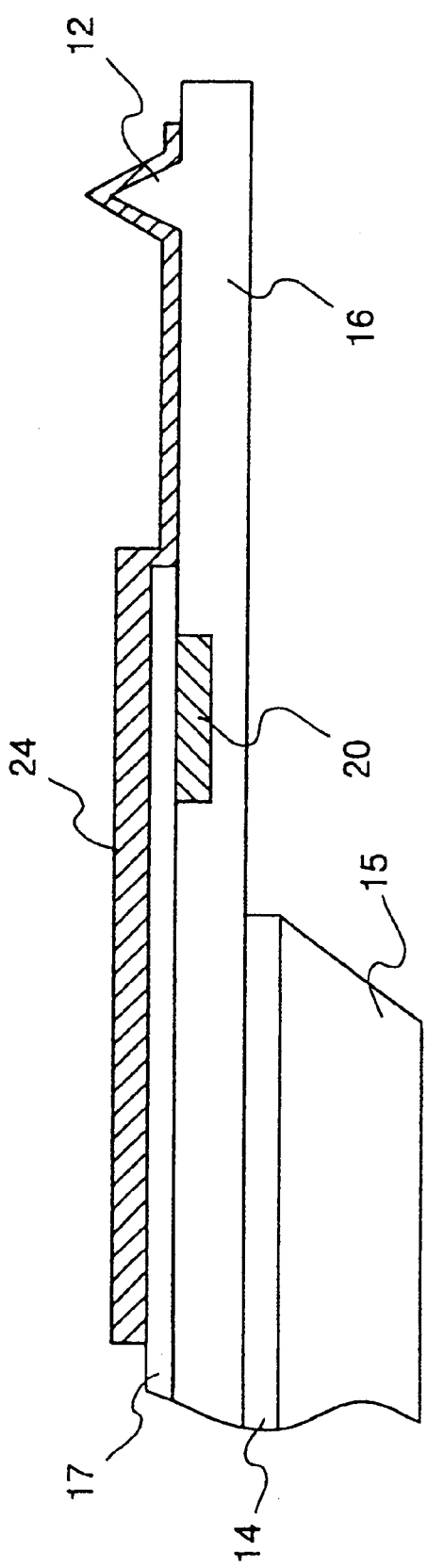
FIG. 7 is a sectional view taken by line B–B' of FIG. 1 according to the second embodiment.

Although the conductive film 22 covering the tip 12 and the conductive layer 24 wired from the conductive film 22 are formed by suitable materials each at different processes, these conductive films can be formed by the similar kinds of materials as shown in FIG. 7. Process of forming the SPM probe in this case is shown in FIGS. 8A to 8C.

As the similar processes to the above-mentioned FIGS. 4A to 4E are carried out first, these descriptions are omitted here and processes continued from FIG. 4E will be described.

Figure 8A:
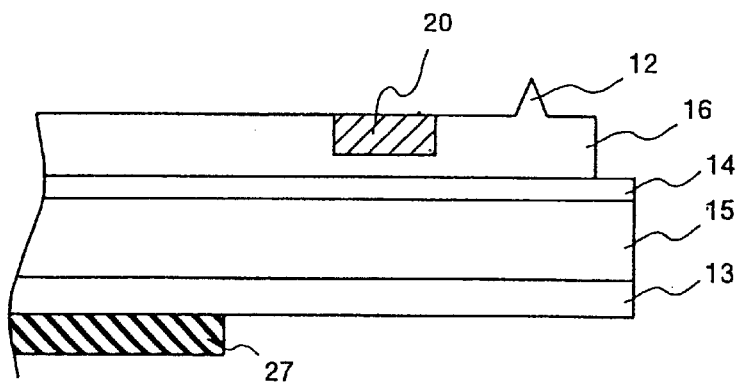
FIGS. 8A to 8C are sectional views describing process of forming the SPM probe according to a second embodiment.

Continuing from the process of FIG. 4E, as shown in FIG. 8A, removing the photoresist film 25, a photoresist film 27 performing an etching mask is formed on the silicon oxide film (SiO₂) 13 of the back side. The silicon oxide film 13 is patterned carrying out back-etching using the buffer hydrofluoric acid solution (BHF) masking the photoresist film 27.

Figure 8B:
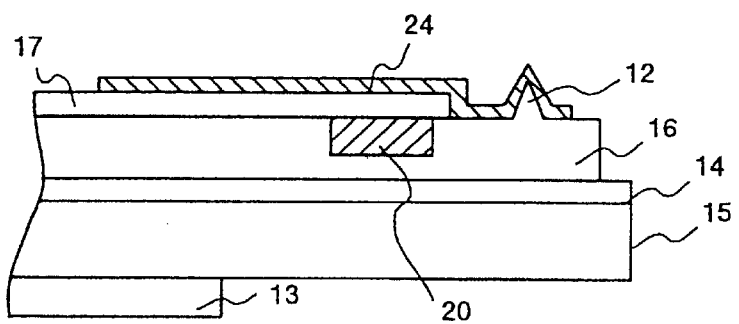
Figure 8C:
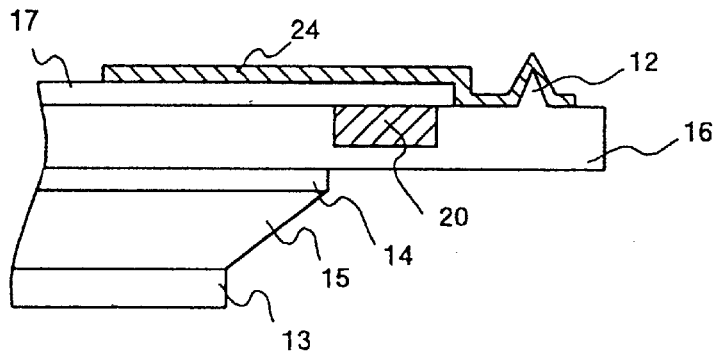

As shown in FIG. 8B, the surface is protected covering from the supporting portion of the silicon layer 16 to region where the piezoresistor 20 at the lever portion is formed with the silicon oxide film 17, and a conductive layer 24 is formed comparatively thick with metal such as aluminum (Al) and the like so as to connect to the supporting portion through surface of the tip 12 and the supporting portion making the silicon film from the surface of the tip with the silicon oxide film 17 as lower layer. At this time, metal contacting portions 32 and 34 are formed burying, for example, aluminum (Al) and the like at a part positioned at the supporting portion of the piezoresistor 20, and conductive layers 26 and 28 wired from the metal contacting portions 32 and 34 with the silicon oxide film 17 as lower layer are formed (not shown.)

As shown in FIG. 8C, a semiconductor substrate 15 is partly removed by carrying out back etching using 40% potassium hydroxide solution (KOH+H₂O) masking the silicon oxide film 13 forming pattern at FIG. 4G. Moreover, oxide layer 14 is partly removed by the BHF. That forms an SPM probe comprising the silicon layer 16 having the piezoresistor 20 and the conductive layer 24.

As above-mentioned, according to the second embodiment, having conductivity at the sample surface and forming electrode wiring from the sample surface can be carried out in one process. Therefore, measurement of surface voltage of the sample is achieved, and the SPM probe prior in sharpness of the tip and the SPM probe prior in conductivity of wiring led from the tip can be provided by selecting material of the conductive layer from the tip so that users can select the suitable SPM probe suited for object of use and the observed sample.

(Third Embodiment)

Although the tip 12 has conductivity by covering the conductive film 22 at surface of the tip 12 in the first and second embodiments, in the third embodiment, as shown in FIG. 9, a conductive region is formed by injecting p⁺ ion similarly as forming the piezoresistor. The conductive region formed in the tip is connected electrically with the conductive layer 24 wired to the supporting portion of the SPM probe. Process of forming the SPM probe in this case will be described referring FIGS. 10A to 10H.

Figure 10A:
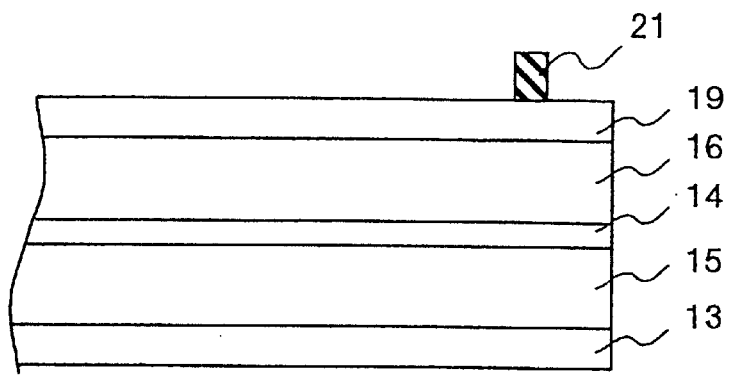
FIGS. 10A to 10H are sectional views describing process of forming the SPM probe according to a third embodiment.
Figure 10B:
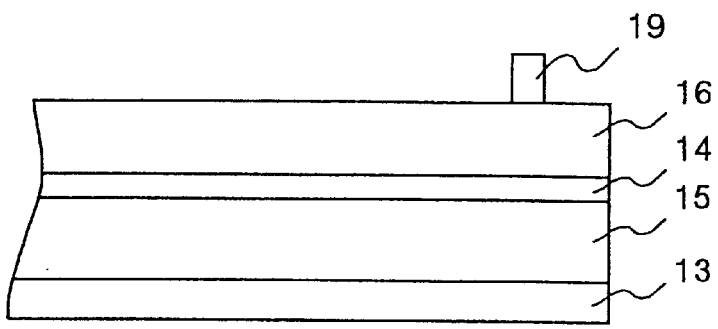
Figure 10C:
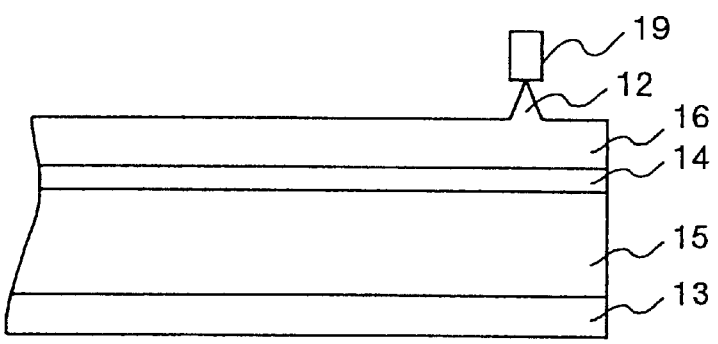

FIGS. 10A to 10C are similar to FIGS. 4A to 4C each.

Figure 10D:
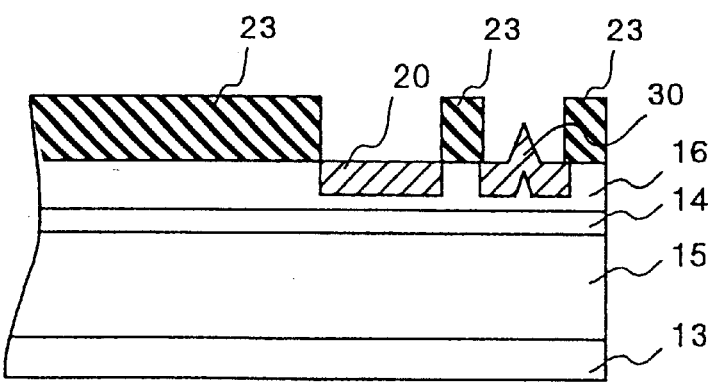

As shown in FIG. 10D, a photoresist film 23 is formed opening a region and a part forming the piezoresistor on surface of the silicon layer 16, and p⁺ piezoresistance region and tip conductive region are formed at the opening part each injecting p⁺ ion at the opening part. By the process, a piezoresistor 20 and the tip conductive region 30 are formed in the silicon layer 16.

Figure 10E:
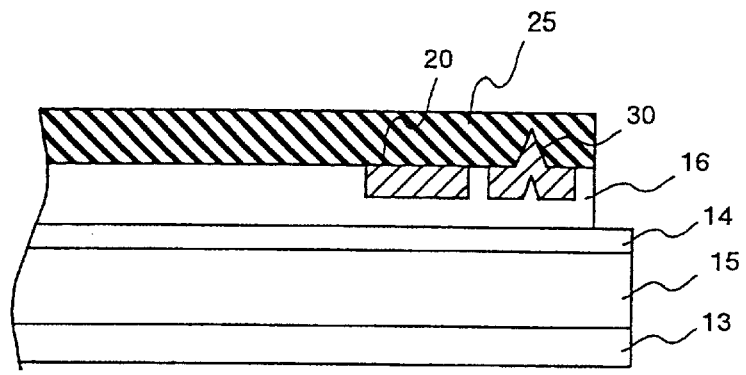

Removing the photoresist film 23, a photoresist film 25 being SPM probe shape is formed on the silicon layer 16 as shown in FIG. 10E. An end portion of the SPM probe is formed by etching the silicon layer 16 till arriving the buried oxide layer 14 using RIE masking the photoresist film 25.

Figure 10F:
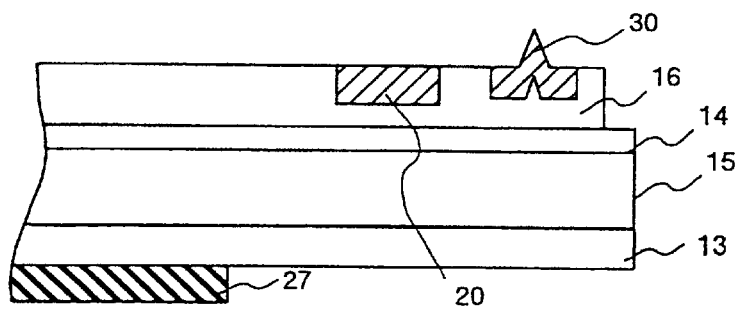

As shown in FIG. 10F, removing the photoresist film 25, a photoresist film 27 performing an etching mask is formed on the silicon oxide film (SiO₂) 13 of the back side. The silicon oxide film 13 is formed using patterning by carrying out back-etching using the buffer hydrofluoric acid solution (BHF) masking the photoresist film 27.

Figure 10G:
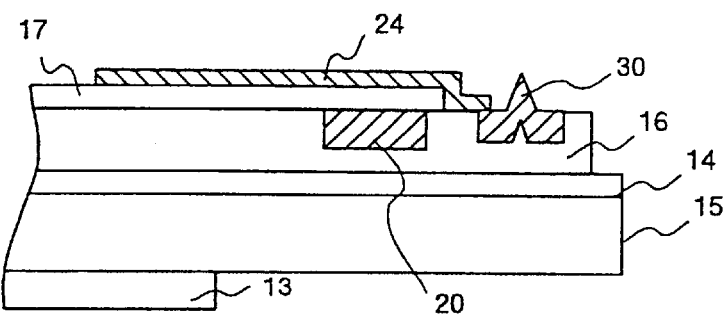

As shown in FIG. 10G, the surface is protected covering from the supporting portion of the silicon layer 16 to region where the piezoresistor 20 at the lever portion is formed with the silicon oxide film 17, and a conductive layer 24 is formed with metal such as aluminum (Al) and the like. Here, one end of the conductive layer 24 positioned at the lever portion and a part of the tip conductive region 22 are connected electrically. At this time, metal contacting portions 32 and 34 are formed burying, for example, aluminum (Al) and the like at part positioned at the supporting portion of the piezoresistor 20, and conductive layers 26 and 28 wired from the metal contacting portions 32 and 34 setting the silicon oxide film 17 lower layer are formed (not shown.)

Figure 10H:
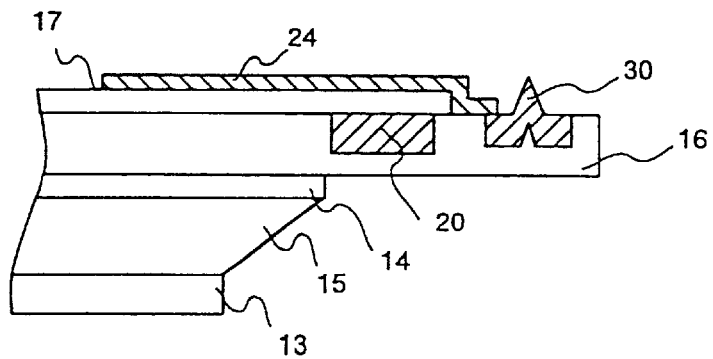

As shown in FIG. 10H, a semiconductor substrate 15 and the buried oxide layer 14 are partly removed by carrying out back-etching using 40% potassium hydroxide solution (KOH+H₂O) masking the silicon oxide film 13 forming pattern at FIG. 10G so as to form an SPM probe comprising the silicon layer 16 having the piezoresistor 20 and the conductive layer 24.

Although p⁺ piezoresistor 20 is formed injecting p⁺ ion to n type silicon layer 16 here, reversely, n⁺ piezoresistor is formed injecting n⁺ ion to the substrate at using p type silicon layer.

As above-mentioned, according to the third embodiment, the tip can have conductivity without losing sharpness by forming the tip conductive region injecting ion to part forming the tip. Therefore, voltage can be supplied between the sample performing one of electrode and the tip by making the other of electrode taking out electrode wiring from the tip conductive region. Because whole of the SPM probe does not conductivity, mixing of noise is prevented, heating of the SPM probe by voltage supply can be prevented, and high voltage small in loss can be supplied by selecting high material in conductivity for electrode wiring taken out from the conductive film.

The lever portion and the supporting portion of the SPM probe are connected by three bending portions, a U-shaped piezoresistor is formed so as to pass through two of the bending portions, and to rest of the bending portions, the tip is connected electrically from vicinity of the tip through the supporting portion with the conductive layer. Therefore, detecting bending quantity of the SPM probe by the piezoresistor is achieved, it is possible to supply voltage to the tip. That means, measurement of interaction between the sample surface and the tip and measurement of surface voltage of the sample are possible without using a detector needing complicated position adjustment.

As the conductive layer connected electrically to the tip at one end thereof is led to the supporting portion of the SPM probe 10 at the other end, the conductive layer is easy to connect an external circuit for supplying voltage to the tip.

Figure 13:
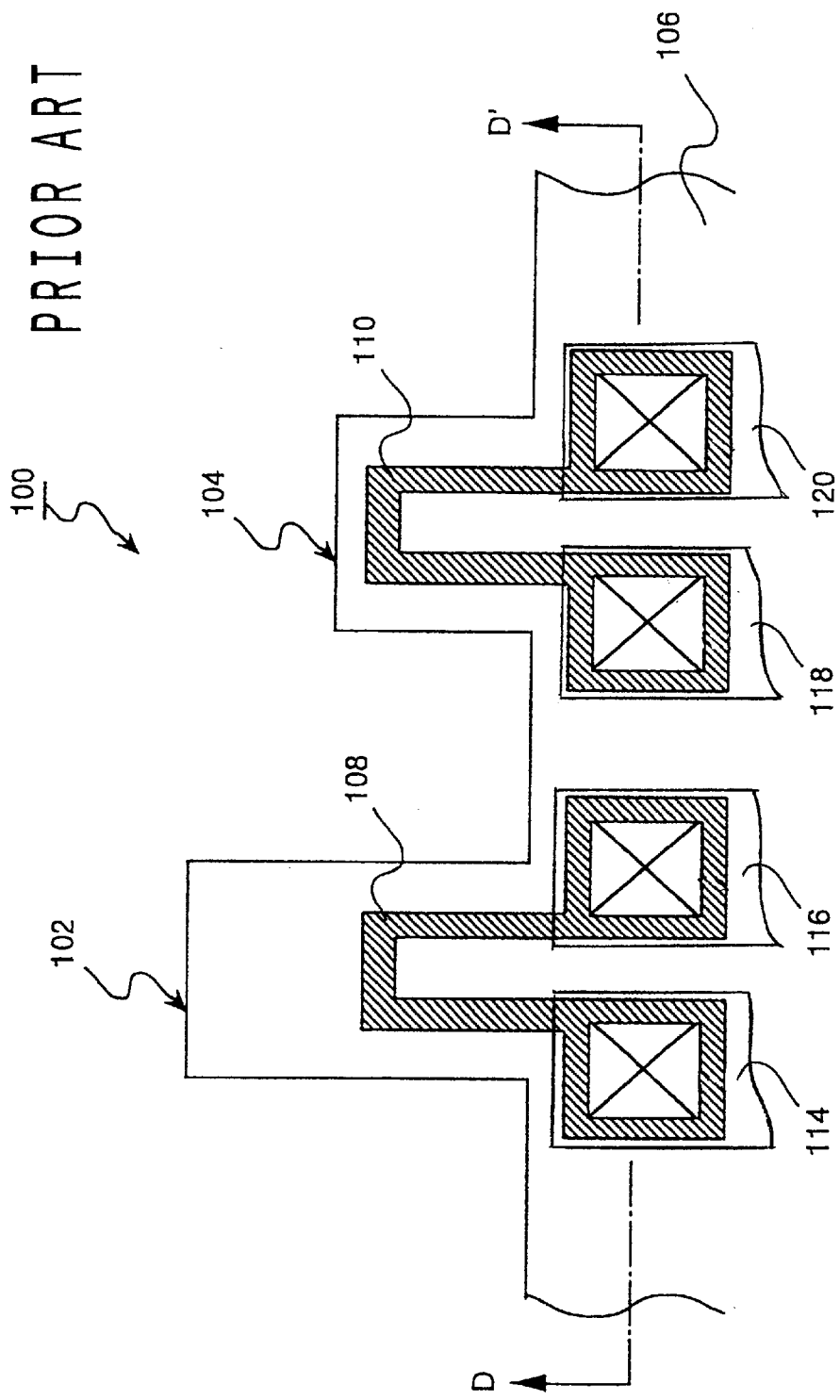
FIG. 13 is a plane view showing the conventional self-detecting SPM probe.
Figure 14:
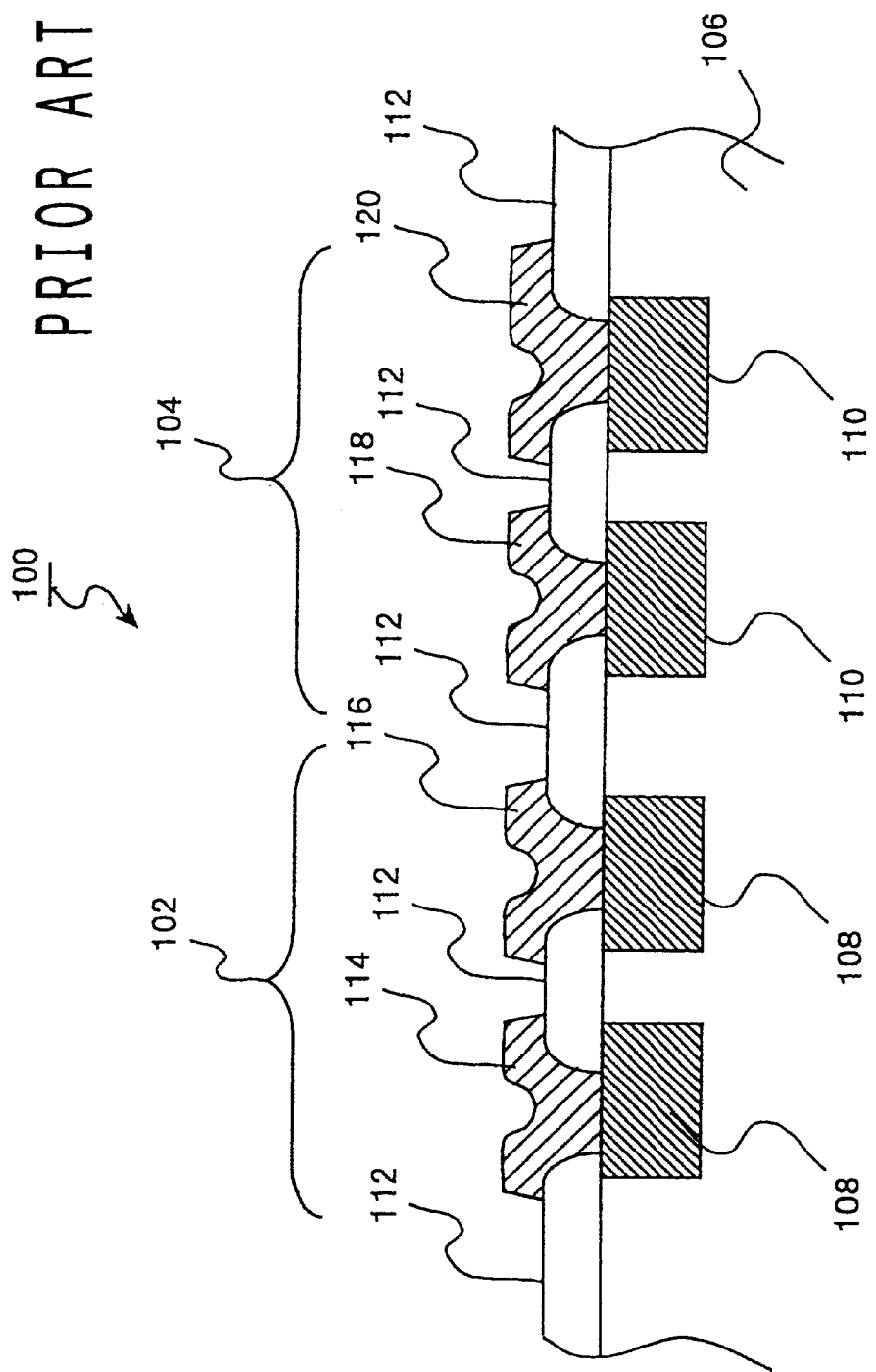
FIG. 14 is a sectional view taken by line D–D' of FIG. 13.

In the first to third embodiment above-mentioned, an SPM probe 10 for reference equivalent to reference 104 of FIG. 13 may be formed at inside of the supporting portion similarly to the conventional self-detecting type SPM.

A conductive layer region wired from region forming the piezoresistor and the tip may be formed on the bending portion using one bending portion formed in the self-detecting type SPM probe.

The figures of the above-mentioned first to third embodiments are differ from actual size in order to make easy to understand the invention. Particularly, although height of the tip 12 is equivalent or low with another parts, the height is generally more than 3 μm it is extremely high comparing another parts.

(Fourth Embodiment)

An SPM probe on a wafer used for the SPM probe is obtained at state in which plural probes are arrange on circular monocrystal thin disk, namely wafer (SOI substrate in the present embodiment) in matrix finally by process of forming described in the first embodiment. Therefore, the SPM probe on the wafer is generally used at state that the probe is taken out individually from wafer. However when dispersion having some tendency on the substrate appears at production in the SPM probe on the wafer for example, it has not known what position on the wafer the SPM probe on the wafer is formed at.

The SPM probe according to the fourth embodiment has an identification mark for identifying position formed on the wafer where the SPM probe on the wafer is used for the SPM probe.

Figure 11:
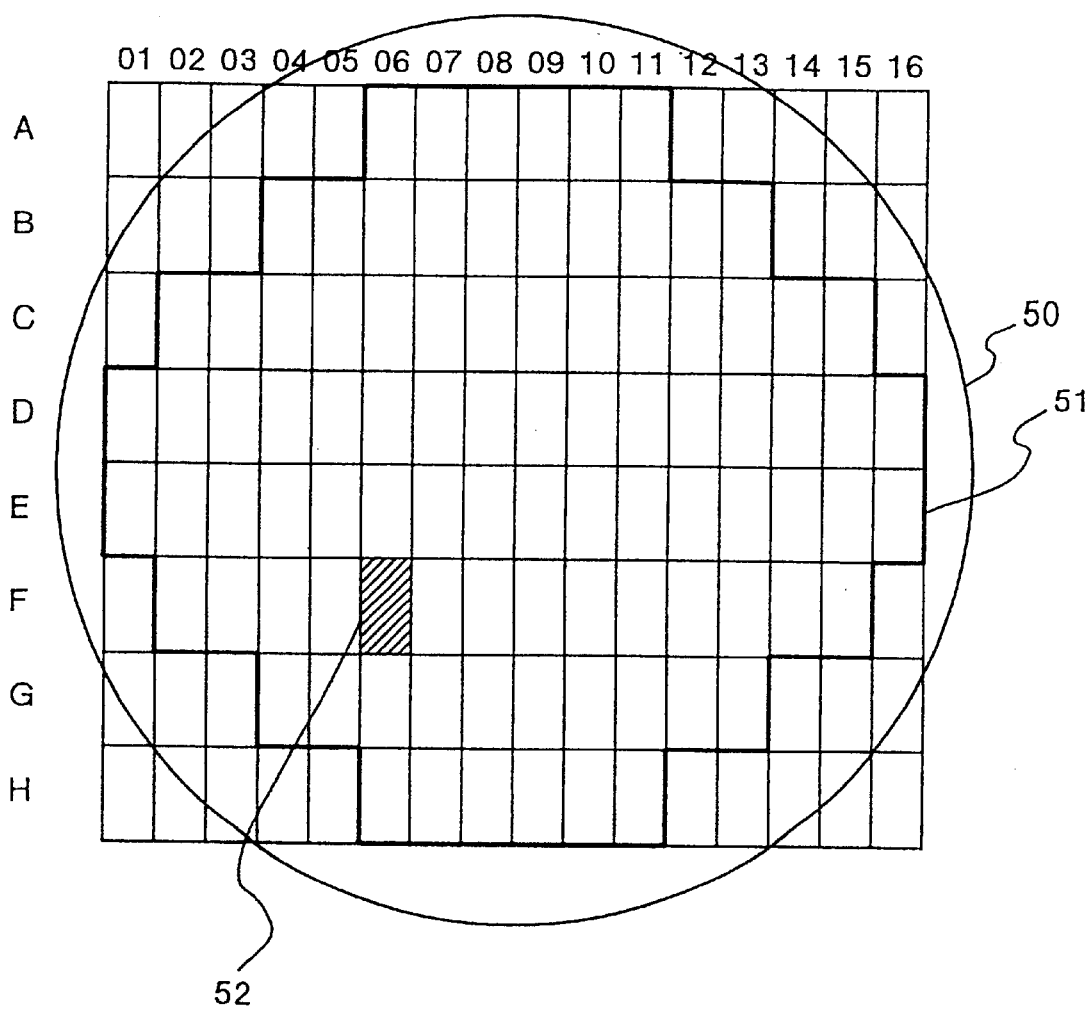
FIG. 11 is a plane view showing a semiconductor wafer forming an SPM probe in matrix shape.

FIG. 11 shows state in which plural SPM probes according to the first to third embodiments, namely the SPM probe on the wafer are formed in matrix at region forming the SPM probes 51 on a silicon wafer 50. Here, region of forming SPM probe on the wafer 51 is a region including in the circular silicon wafer 50, particularly, each SPM probe on the wafer is divided in rectangular region, and plural probes are included.

Identification marks are given individually to plural SPM probes on the wafer. For example, as shown in FIG. 11, it is considered that element zone of matrix, namely the maximum numbers arranged along long axis direction of rectangle of each SPM probe on the wafer (8 in FIG. 11) and maximum numbers arranged along short axis direction (16 in FIG. 11) make virtual matrix (8×16 in FIG. 11) arranged each vertically and horizontally in the region forming the SPM probe on the wafer. Symbols: A, B, C and so on are marked to element zone along vertical axis of the virtual matrix. Similarly, Numbers: 01, 02, 03 and so on are marked to element zone along horizontal axis. By the mark, element zone in the virtual matrix is identified by the symbol and the number, called an identification mark. For example, an SPM probe on the wafer 52 can be expressed as element zone of F-06. In this case, although the SPM probe on the wafer is not actually formed at element zone not including in the region forming the SPM probe on the wafer 51 (for example, A-01 to A-05), consideration of rectangle matrix is easy to understand intuitively in order to identify position on the wafer from the identification mark. Mark used for the identification mark may be permitted if they are symbols or numbers identifying position in the matrix.

Figure 12:
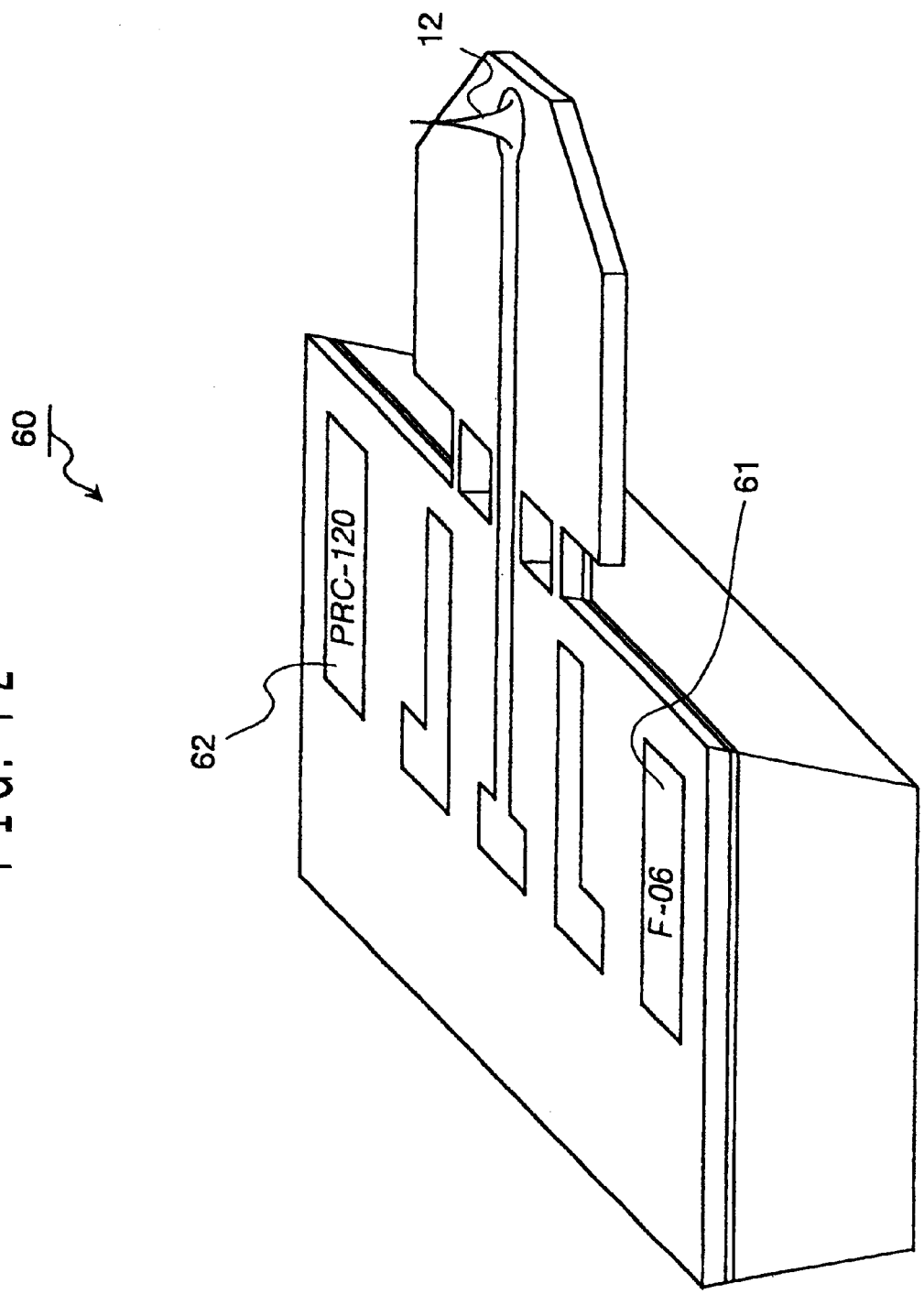
FIG. 12 is a perspective view showing an SPM probe forming an identification mark according to fourth embodiment.

FIG. 12 shows an SPM probe on the wafer forming the identification mark 61 or 62 determined as the above-mentioned on the supporting portion of the SPM portion according to the first to third embodiments. These identification marks are made of aluminum (Al) and the like at the same time with the metal contacting portions 32 and 34 and the conductive layer 26, 28, and 24 at the process shown in FIG. 1, for example, as one of the SPM probe on the wafer described in the first embodiment.

As above-mentioned, according to the fourth embodiment, position on wafer forming the SPM probe on the wafer is identified by the identification mark by marking the identification mark on the SPM probe on the wafer. Therefore, distribution of position of rejected SPM probe on the wafer can be obtained for rejected SPM probe on the wafer, cause rejected is identified by the distribution of position of the rejected SPM probe on the wafer, process of forming the SPM probe on the wafer is improved so as to make repeatability high and to make excellent process in order to remove the cause.

(Fifth Embodiment)

Figure 15:
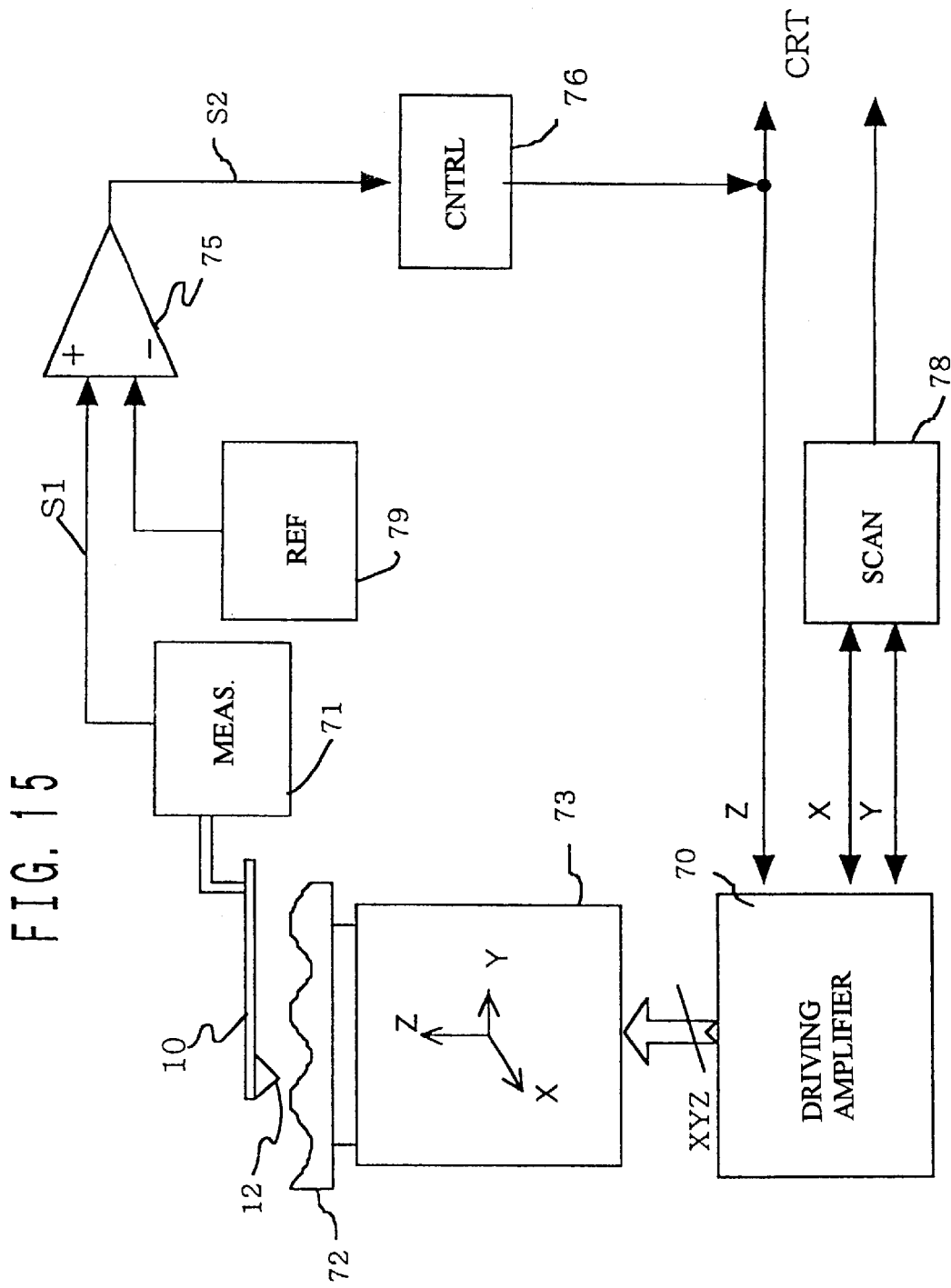
FIG. 15 is a block diagram showing an SPM device according to fifth embodiment.

FIG. 15 is a block diagram showing a general constitution of a scanning probe microscope using the SPM probe according to the first to fourth embodiments. A sample 72 is installed on a three-dimension sample stage 73, and the tip 12 of the SPM probe having the above-mentioned constitution is arranged over the sample 72 opposite each other. A measuring portion 71 applies bias signal to the SPM probe 10, and amplifies output signal depending on deflection of the SPM probe 10. Detecting signal S1 of the SPM probe detected by the measuring portion 71 is inputted to non-inversion in put terminal (+) of a differential amplifier 75.

Reference value about detecting signal of the SPM probe 10 is inputted from a reference value generating portion 79 to inversion input terminal (−) so that output of the differential amplifier 75 becomes zero when bending quantity is zero. Error signal S2 outputted from the differential amplifier 75 is inputted to a control portion 76. The control portion 76 controls an actuator driving amplifier 70 so that error signal S2 approaches zero. Output signal of the control portion 76 is outputted to a CRT as luminance signal. A scanning signal generating portion 78 outputs signal for scanning the sample 72 to XY direction to the actuator driving amplifier 70, and outputs raster scanning signal to the CRT. By these operations, three dimension image corresponding to output signal of the SPM probe is displayed on the CRT. As the constitution of the device shows about a general device, it is possible that the device is constituted by another way if function and the like are same as the above.

According to the present invention of the first aspect, as the tip has conductivity by covering the conductive film at the tip surface, it is possible that voltage is supplied between the sample being one side of electrode and the tip by taking out wiring from the conductive film for the other side of electrode. As the whole of SPM prove does not have conductivity, mixing of noise can be protected.

According to the present invention of a second aspect, it is possible to prevent heating of the SPM probe by voltage supply and to supply high voltage being small in loss by taking out wiring from the conductive film covering the tip surface and by selecting material being high in conductivity as wiring.

According to the present invention of the third aspect, as the probe has conductivity by covering the conductive film at the tip surface, one side of electrode is formed wiring the conductive layer from the conductive film and it is possible to supply voltage between the sample being the other side of electrode and the tip. As whole of the SPM probe does not have conductivity, it is possible to prevent heating of the SPM probe by voltage supply and to supply high voltage being small in loss. It is possible to measure interaction between the sample surface by detecting bending quantity of the SPM probe caused by the piezoresistor and the tip and to measure voltage of the sample surface without using a detector needing complicated adjustment.

According to the invention of the fourth aspect, as the probe has conductivity by covering the conductive film at the tip surface, one side of electrode is formed wiring the conductive layer from the conductive film and it is possible to supply voltage between the sample being the other side of electrode and the tip.

According to the invention of the fifth aspect, as the probe has conductivity by covering the conductive film at the tip surface, one side of electrode is formed wiring the conductive layer from the conductive film and it is possible to supply voltage between the sample being the other side of electrode and the tip.

According to the present invention of the sixth aspect, the tip can have conductivity without losing sharpness by forming the conductive region by ion-injection at part forming the tip. Therefore, it is possible that voltage is supplied between the sample being one side of electrode and the tip by taking out wiring from the conductive film for the other side of electrode. As the whole of SPM prove does not have conductivity, mixing of noise can be protected.

According to the SPM according to the present invention of a seventh aspect, the electrode wiring can be taken out from conductive region formed at the tip, and it is possible to prevent heating of the SPM probe by voltage supply and supply high voltage being small in loss by selecting high material in conductivity as the electrode wiring.

According to the present invention of the eighth aspect, as the probe forms tip conductive region by ion-injecting at part forming the tip, the tip can have conductivity without losing sharpness. Therefore it is possible to supply voltage between the sample being one side of electrode and the tip by making the other electrode taking out wiring from the tip conductive region. As whole of the SPM probe does not have conductivity, it is possible to prevent mixing noise, to prevent heating of the SPM probe by voltage supply, and to supply high voltage being small in loss.

According to the invention of ninth aspect, the SPM probe forming the piezoresistor has conductivity at the tip surface and the conductive layer from the tip surface. Therefore, it is possible to measure interaction between the sample surface by detecting bending quantity of the SPM probe caused by the piezoresistor and the tip and to measure voltage of the sample surface without using a detector needing complicated adjustment. By selecting material of the conductive layer led from the tip, an SPM probe having a priority in sharpness of the tip and an SPM probe having a priority in conductivity of wiring led from the tip can be provided. Therefore, users can select a suitable SPM probe for object of use or the observed sample.

According to the invention of the tenth aspect, the identification for identifying position on the semiconductor wafer mark is formed at the SPM probe formed at the semiconductor wafer as the SPM probe. As the position on the semiconductor wafer in which the SPM probe is formed can be identified, positional distribution of rejected SPM probes on the wafer can be obtained for the rejected SPM probes by reading out the identification mark even if the SPM probe is taken from the semiconductor wafer.

According to the invention of eleventh aspect, by using any of the SPM probes of the first to tenth aspects, adjustment of laser beam is not need because of self-detecting type cantilever in use of the device comparing with the conventional optical lever type device, operation of the device is easy. Noise is decreased by forming an exclusive electrode so as to observe more accurately.

What is claimed is:

1. A method of forming an SPM probe on a semiconductor wafer comprising the step of: forming an identification mark for identifying a position on the semiconductor wafer at which the SPM probe is formed, the identification mark being formed on a supporting portion of the SPM probe so that the position on the semiconductor wafer at which the SPM probe is formed can later be identified when the SPM probe is separated from the semiconductor wafer.

2. A method of forming an SPM probe according to claim 1; further comprising the steps of forming the SPM probe with a lever portion at which a sharpened tip is formed at an edge thereof and a supporting portion for supporting the lever portion; and forming a conductive film at the tip and in a vicinity of the tip.

3. A method of forming an SPM probe according to claim 2; further comprising the step of forming wiring on the SPM probe from a vicinity of the tip of the conductive film.

4. A method of forming an SPM probe according to claim 1; further comprising the steps of forming the SPM probe by forming a lever portion having a sharpened tip at an edge thereof, forming a supporting portion for supporting the lever portion, forming a bending portion connecting the lever portion and the supporting portion, forming a piezoresistor in the SPM probe in a U-shape and extending through the bending portion, forming a conductive film covering the tip and a vicinity thereof, forming an insulation layer on the piezoresistor and the supporting portion, and forming a conductive layer connecting electrically to the conductive film in the vicinity of the tip and connecting to the supporting portion through the bending portion from the lever portion.

5. A method of forming an SPM probe according to claim 4; wherein the conductive layer is formed over the conductive film at a part where the conductive layer and the conductive film are connected electrically.

6. A method of forming an SPM probe according to claim 4; wherein the conductive layer is formed under the conductive film at a part where the conductive layer and the conductive film are connected electrically.

7. A method of forming an SPM probe according to claim 1; further comprising the steps of forming the SPM probe with a lever portion having a sharpened tip at an edge thereof and a supporting portion for supporting the lever, and forming a conductive region by injecting ions in the tip.

8. A method of forming an SPM probe according to claim 7; further comprising the step of forming wiring on the SPM probe from a vicinity of the tip of the conductive region.

9. A method of forming an SPM according to claim 1; further comprising the steps of forming the SPM probe by forming a lever portion having a sharpened tip at an edge thereof, forming a supporting portion for supporting the lever portion, forming a bending portion connecting the lever portion and the supporting portion, and forming a piezoresistor in the SPM probe in a U-shape and extending through the bending portion, forming a conductive region in the tip by ion injection, forming an insulation layer on the piezoresistor and the supporting portion, and forming a conductive layer connecting electrically to the conductive region in a vicinity of the tip and connecting to the supporting portion through the bending portion from the lever portion.

10. A method of forming an SPM probe according to claim 1; further comprising the steps of forming a lever portion having a sharpened tip at an edge thereof, forming a supporting portion for supporting the lever portion, forming a bending portion connecting the lever portion and the supporting portion, forming a piezoresistor in the SPM probe in a U-shape and extending through the bending portion, forming an insulation layer on the piezoresistor and the supporting portion, and forming a conductive layer covering the tip and a vicinity thereof and connecting to the supporting portion through the bending portion from the lever portion.

11. An SPM device using an SPM probe formed according to any one of claim 1 to claim 10.

12. A method of forming an SPM probe on a semiconductor substrate, comprising the steps of: forming a lever portion in the substrate; forming a tip having a sharp point in the lever portion proximate a first end thereof; forming a supporting portion in the substrate for supporting the lever portion; forming a bending portion in the substrate for connecting the lever portion and the supporting portion and being connected to a second end of the lever portion opposite the first end; forming a piezoresistor in the SPM probe extending from the lever portion to the supporting portion through the bending portion; and forming a conductive region including the tip and extending to the supporting portion through the bending portion so that a voltage may be applied between the tip and a sample surface.

13. A method of forming an SPM probe according to claim 12; wherein the conductive region is provided on a region of the bending portion at which the piezoresistor is not formed.

14. A method of forming an SPM probe according to claim 12; further comprising the step of forming an insulating film between the piezoresistor and the conductive film.

15. A method of forming an SPM probe according to claim 12; wherein the step of forming a conductive region comprises the steps of forming a first conductive film covering the tip, and forming a second conductive film contacting and extending from the first conductive film to the supporting portion through the bending portion.

16. A method of forming an SPM probe according to claim 15; wherein the first conductive film is formed under the second conductive film at a part where the first and second conductive films are in contact.

17. A method of forming an SPM probe according to claim 15; wherein the first conductive film is formed over the second conductive film at a part where the first and second conductive films are in contact.

18. A method of forming an SPM probe according to claim 12; wherein the step of forming the conductive region comprises the steps of injecting ions in the tip so that the tip becomes conductive and forming a conductive film extending from the tip to the supporting portion through the bending portion.

19. A method of forming an SPM probe according to claim 18; further comprising the step of forming an insulation layer on the piezoresistor and the supporting portion between the substrate and the conductive film.

20. A method of forming an SPM probe according to claim 12; further comprising the step of forming an identification mark on the SPM probe for specifying a location on the semiconductor substrate at which the SPM probe is formed so that the location on the substrate at which the SPM probe is formed can be identified after the SPM probe has been separated from the semiconductor substrate.

21. A method of forming an SPM probe according to claim 12; wherein the steps of forming the lever portion and the bending portion comprise etching the substrate at a first surface to form the lever portion and bending portion in desired shapes and etching the substrate at a second surface to reduce a thickness thereof so that the lever portion and the bending portion have a smaller thickness than the supporting portion.

22. A method of forming an SPM probe according to claim 21; wherein the step of etching the substrate to form the bending portion comprises the step of etching the substrate to form at least two separate portions connecting the lever portion and the supporting portion; and the step of forming the piezoresistor comprises the step of forming a U-shaped piezoresistor in the substrate having first and second ends at the supporting portion and extending from the supporting portion through both portions of the bending portion to the lever portion.

23. A method of forming an SPM probe according to claim 12; wherein the substrate comprises a semiconductor substrate.

24. A method of forming an SPM probe according to claim 23; wherein the substrate comprises an SOI substrate.

25. An SPM device having an SPM probe formed according to claim 12.

26. A method of forming an SPM probe on a semiconductor substrate, comprising a step for forming a lever portion in the substrate; a step for forming a tip having a sharp point in the lever portion proximate a first end thereof; a step for forming a supporting portion in the substrate for supporting the lever portion; a step for forming a bending portion in the substrate for connecting the lever portion and the supporting portion and being connected to a second end of the lever portion opposite the first end; a step for forming a piezoresistor in the SPM probe extending from the lever portion to the supporting portion through the bending portion; and a step for forming a conductive region including the tip and extending to the supporting portion through the bending portion so that a voltage may be applied between the tip and a sample surface.

27. A method of forming an SPM probe comprising the steps of:

providing a substrate having top and bottom surfaces;

etching the top surface of the substrate to form a tip having a sharp point therein;

forming a piezoresistor in the top surface of the substrate;

etching the top surface of the substrate in the shape of a cantilever probe having a supporting portion, a lever portion and one or more bending portions connecting the supporting portion to the lever portion, the etching being conducted so that the sharp point is proximate a distal end of the lever portion opposite the bending portion and the piezoresistor extends from the lever portion to the supporting portion through the bending portion;

etching the bottom surface of the substrate so that a thickness of the supporting portion is greater than that of the lever portion and the bending portion; and forming a conductive region including the tip and extending through the bending portion to the supporting portion so that a voltage may be applied across the tip and a sample surface.

28. A method of forming an SPM probe according to claim 27; wherein the step of forming a conductive region comprises the step of forming a conductive film covering the tip and extending through the bending portion to the supporting portion.

29. A method of forming an SPM probe according to claim 28; wherein the step of forming a conductive film comprises the steps of forming a first conductive film covering the tip and forming a second conductive film contacting the first conductive film and extending through the bending portion to the supporting portion.

30. A method of forming an SPM probe according to claim 27; wherein the step of forming a conductive region comprises the steps of injecting ions in the tip so that the tip becomes conductive and forming a conductive film extending from the tip to the supporting portion through the bending portion.

31. A method of forming an SPM probe on a semiconductor substrate, comprising the steps of: forming a lever portion in the substrate having a tip proximate a distal end thereof; forming a supporting portion in the substrate for supporting the lever portion; forming a piezoresistor in the SPM probe extending from the lever portion to the supporting portion; and forming a conductive region including the tip and extending to the supporting portion.

32. A method of forming an SPM probe according to claim 31; further comprising the step of forming the tip with a sharp point proximate a first end of the lever portion.

33. A method of forming an SPM probe according to claim 32; further comprising the step of forming a bending portion in the substrate for connecting the lever portion and the supporting portion and being connected to a second end of the lever portion opposite the first end.

34. A method of forming an SPM probe according to claim 31; further comprising the step of forming a bending portion in the substrate for connecting the lever portion and the supporting portion.

35. A method of forming an SPM probe according to claim 31; further comprising the step of forming an insulating film between the piezoresistor and the conductive film.

36. A method of forming an SPM probe according to claim 31; wherein the step of forming a conductive region comprises the steps of forming a first conductive film covering the tip, and forming a second conductive film contacting and extending from the first conductive film to the supporting portion.

37. A method of forming an SPM probe according to claim 36; wherein the first conductive film is formed under the second conductive film at a part where the first and second conductive films are in contact.

38. A method of forming an SPM probe according to claim 36; wherein the first conductive film is formed over the second conductive film at a part where the first and second conductive films are in contact.

39. A method of forming an SPM probe according to claim 31; wherein the step of forming the conductive region comprises the steps of injecting ions in the tip so that the tip becomes conductive and forming a conductive film extending from the tip to the supporting portion.

40. A method of forming an SPM probe according to claim 31; further comprising the step of forming an identification mark on the SPM probe for specifying a location on the semiconductor substrate at which the SPM probe is formed so that the location on the substrate at which the SPM probe is formed can be identified after the SPM probe has been separated from the semiconductor substrate.

* * * * *